March 25, 1952   R. TEMPLE   2,590,585
EXPLOSIVELY ACTUATED BONDING TOOL
Original Filed April 30, 1947   2 SHEETS—SHEET 1

Inventor
ROBERT TEMPLE
By Brown, Critchlow, Flick & Peckham
his Attorneys

March 25, 1952     R. TEMPLE     2,590,585
EXPLOSIVELY ACTUATED BONDING TOOL

Original Filed April 30, 1947     2 SHEETS—SHEET 2

Inventor
ROBERT TEMPLE.
By Brown, Critchlow, Flick & Peckham
his Attorneys.

Patented Mar. 25, 1952

2,590,585

UNITED STATES PATENT OFFICE 2,590,585

EXPLOSIVELY ACTUATED BONDING TOOL

Robert Temple, Swissvale, Pa., assignor to Temple Velocity Equipment, Inc., Wilmington, Del., a corporation of Delaware Substituted for application Serial No. 745,087, April 30, 1947. This application February 1, 1951, Serial No. 208,959

7 Claims. (Cl. 1—47)

This invention relates to explosively actuated tools for bonding or riveting plates or sheets together. This application is filed as a substitute for applicant's abandoned application, Serial Number 745,087, filed April 30, 1947.

It is among the objects of this invention to provide such a tool which is simple in construction and operation, which is small and light, which has very great power for its size, which can be operated easily by one person, which is adjustable for plates of different thicknesses, and which tightly bonds the plates together.

In accordance with this invention a frame, preferably in the form of a C-shape yoke, has substantially parallel arms spaced apart to provide a slot between them adapted to receive a plurality of members such as plates or the like, which are to be riveted together. An anvil is carried by one of the arms and faces the other arm which has an opening through it in line with the anvil. A barrel extends through this opening and is adjustable axially thereof so that the plates can be clamped between the barrel and anvil. Means are carried by the outer end of the barrel for supporting and firing an explosive cartridge into the barrel. The explosion drives forward in the barrel a stud which has a head at its rear end. When the front end of the stud is to be headed like a rivet, the rear head is connected by a shank with a pointed front end of harder material than the shank. The shank is longer than the combined thicknesses of the plates so that its front end portion will project from them when the hard point is driven through them by the force of the explosion. The anvil is provided with a socket which is shorter and wider than the projecting front end portion of the stud shank. This socket receives and upsets that portion of the shank to form a head engaging the adjoining plate. Consequently, the plates will be clamped tightly together by the heads on the opposite ends of the shank. Before the stud is driven into the plates, its head preferably is supported in a cartridge-receiving block removably mounted in the outer end of the barrel. This block may be held in place by a removable breech-block.

Figure 1:
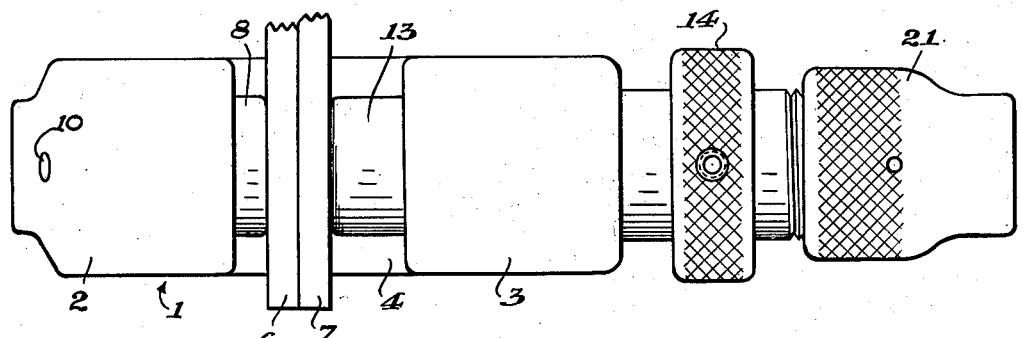
Figure 2:
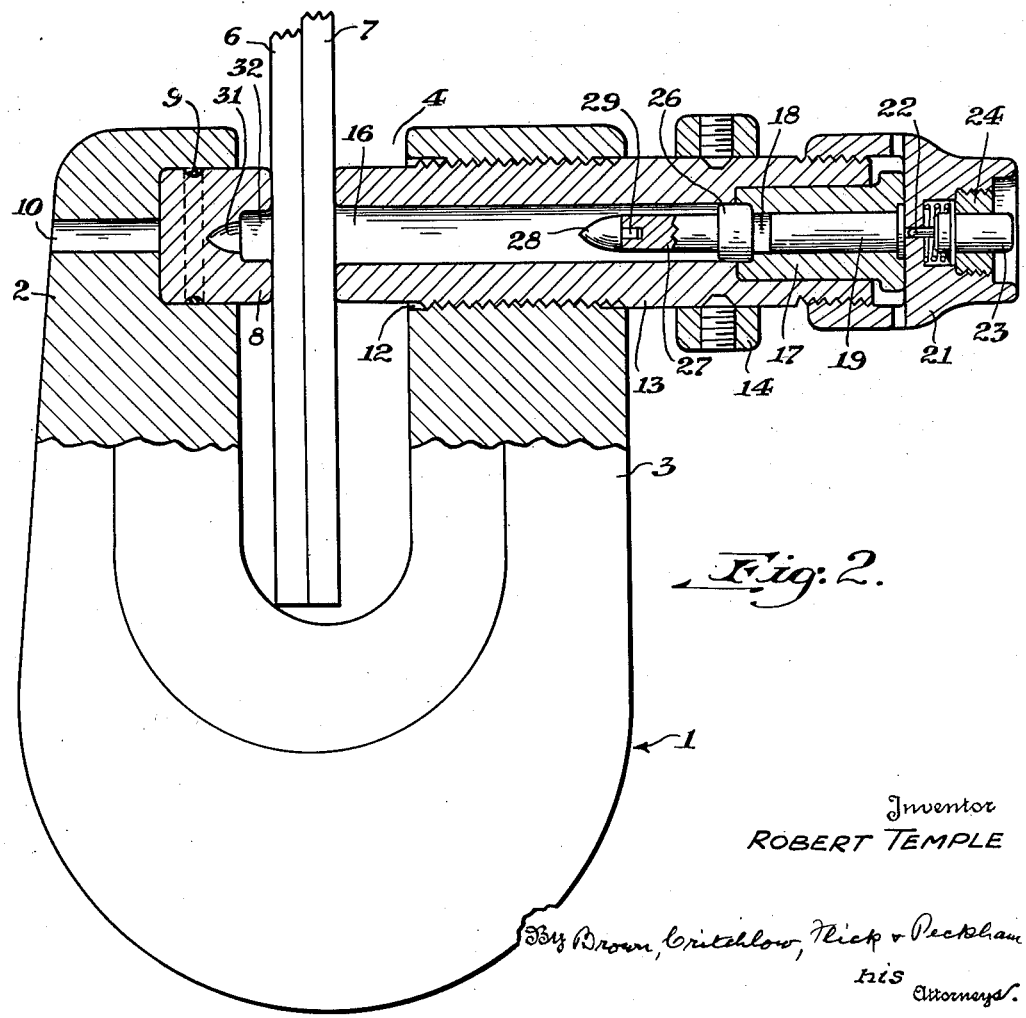
Figures 3, 4:
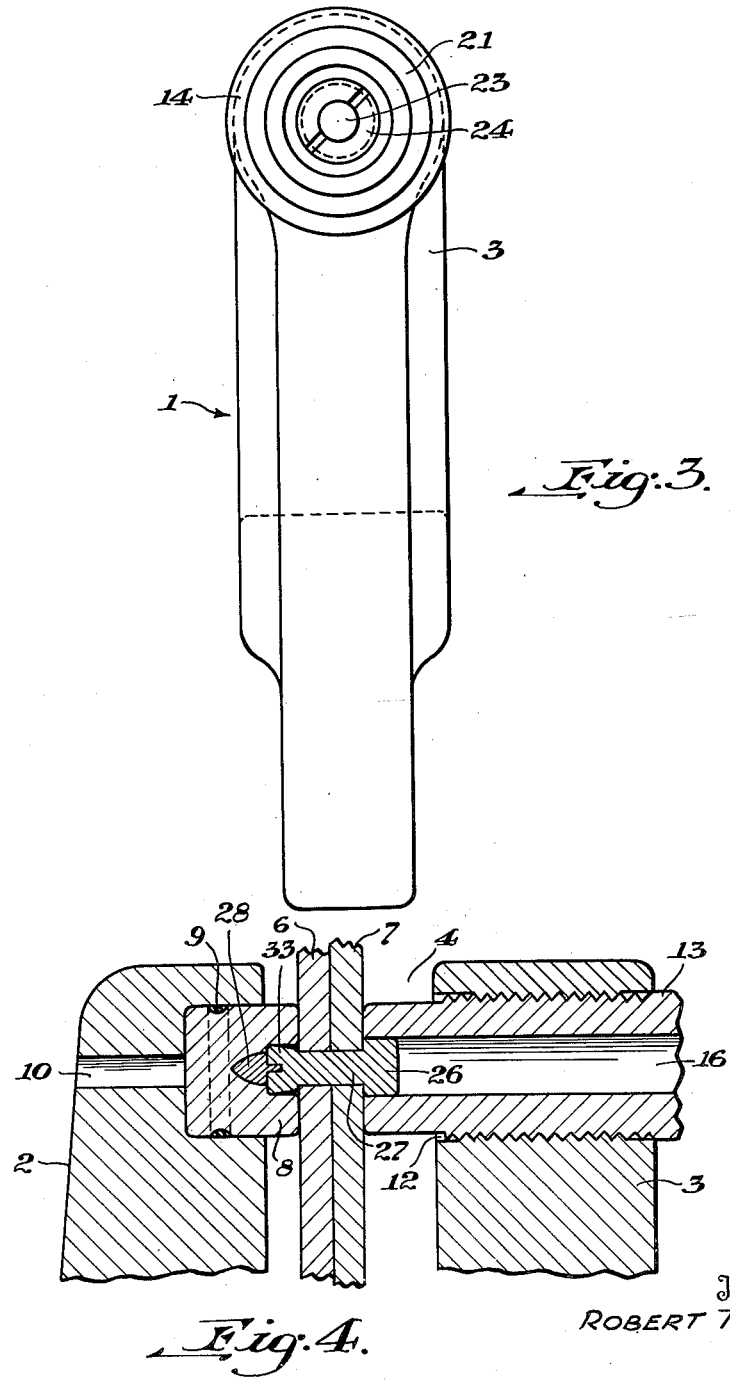

The preferred embodiment of the invention is illustrated in the accompanying drawings in which Fig. 1 is a plan view of the tool clamped onto a pair of plates about to be riveted together; Fig. 2 is a side view with the upper portion of the tool shown in vertical section; Fig. 3 is an end view of the tool; and Fig. 4 is a fragmentary vertical section of the upper portion of the tool showing the stud after it has been driven into the plates and upset.

Referring to Figs. 1, 2, and 3 of the drawings, a C-shape yoke 1 has parallel arms 2 and 3 between which there is a slot 4 for receiving the work, for example, a pair of plates 6 and 7. The inner face of arm 2 is provided with a recess in which an anvil 8 is removably mounted. The anvil is provided with a peripheral groove in which there is a rubber band 9 that frictionally engages the side of the recess to hold the anvil in place. The same arm has a passage 10 extending through it behind the anvil and in which a rod or the like can be inserted to push the anvil out of the recess.

The opposite arm 3 is provided with a threaded opening 12 in axial alignment with the anvil, and a cylindrical barrel 13 is screwed into this opening from both ends of which it projects. Rigidly mounted on the barrel outside of the yoke is a knurled ring 14 by which the barrel can be screwed against plates 6 and 7 to clamp them tightly together between the barrel and anvil. The outer end portion of the passage 16 through the barrel is enlarged to slidably receive a cartridge block 17 likewise provided with an axial passage 18 through it. Disposed in the block passage is an explosive cartridge 19 which is held in place by a breech-block 21 screwed onto the outer end of the barrel. This block also engages the outer end of the cartridge block to hold it in the barrel. To detonate the cartridge, the breech-block is provided with an axial passage 22 in which a firing pin 22 is slidably mounted. A head 23 on the pin extends through a retaining nut 24 screwed into the breech-block. When the outer end of the head is struck by a hammer, the firing pin is driven against the usual percussion cap in the outer end of the cartridge to explode the latter. The expanding gases resulting from the explosion drive a stud into the plates clamped between the block and anvil.

The stud has at its rear end a head 26 that slidably engages the inside of the barrel and that is thick or long enough to hold the shank 27 of the stud concentric with the barrel. The head fits tightly into the enlarged inner end of the cartridge block passage 18 so that the stud has to be driven into the cartridge block before the block is inserted in the barrel. When the cartridge block is placed in the barrel, the stud will be supported by the block in the position shown in Fig. 2, a short distance in front of the cartridge until it is fired. The head of the stud then will serve as a piston against which the expanding gases will act to drive the stud forward through the barrel as soon as sufficient pressure is built up to overcome the friction between stud and block.

The stud has a pointed front end for penetrating the plates, and preferably is made in two separate parts, the head and shank forming one part, and the other part being a conical point 28 that is detachably connected to the shank. Thus, the front end of the shank may be provided with an axial opening that frictionally receives a short stem 29 on the rear end of the point. The reason that the stud is made in two parts is that the point must be hard enough to penetrate the plates, but a portion of the stud should be soft enough to upset readily in order to form another head engaging the side of the plates opposite to head 26. Therefore, the point is made of hard metal while the shank is relatively soft, but not soft enough to upset until forward movement of the point is stopped. Also, the shank is longer than the combined thickness of the plates so that the front end portion of the shank will pass entirely through the plates and project from them. To form a head on the front end portion of the stud shank projecting from the same side of the plates as the hard point, the anvil is provided with a recess having an inner tapered portion 31 of a size and shape to receive the point of the stud, and an outer socket portion 32 which not only is of greater diameter than the stud shank, but which also is shorter than the front portion of the shank that is driven completely through the plates. Forward movement of the stud point is arrested when it seats in conical recess 31, but as head 26 and the shank continue to travel forward the front end portion of the shank has to spread out in socket 32, thereby forming a head 33 (Fig. 4) engaging the adjoining plate 6. Consequently, the two plates are compressed or clamped together between the two heads on shank 27.

After the plates have been riveted together in this manner, the barrel is unscrewed from the yoke far enough to allow the two plates with their connecting rivet to be removed from the yoke, or to be shifted to another position to receive another rivet. The hard point 28, still projecting from the newly formed head on the stud, then can be knocked off if desired. The breech-block 21 and cartridge block 17 are removed from the barrel, and a new cartridge and stud are inserted in the opposite ends of the cartridge block which then is replaced in the barrel and locked in position by the breech-block.

Different types and sizes of studs can be used, depending on the kind of work to be done, and an anvil formed for receiving the particular kind of stud used is placed in the yoke. Even a threaded stud can be used, because it has been found that the threads will pass through the plates without being damaged. In such a case, the socket in the anvil is made deep enough to receive the projecting threaded end of the stud without upsetting it.

According to the provisions of the patent statutes, I have explained the principle and construction of my invention and have illustrated and described what I now consider to represent its best embodiment. However, I desire to have it understood that, within the scope of the appended claims, the invention may be practiced otherwise than as specifically illustrated and described.

I claim:

1. A tool comprising a frame having substantially parallel arms spaced apart to form a slot between them adapted to receive a plurality of superimposed members to be riveted together, an anvil carried by one of the arms and facing the other arm, said other arm having an opening therethrough in line with the anvil, a barrel extending through said opening and adjustable axially therein, whereby said members can be clamped between the barrel and anvil, means carried by the outer end of the barrel for supporting an explosive cartridge, the barrel being adapted to slidably receive a stud, and means carried by the outer end of the barrel to detonate the cartridge in order to drive the stud partially through said members, said anvil being provided with a socket shorter and wider than the portion of the stud partially driven through said members to receive that portion in order to upset it to form a head engaging the superimposed members.

2. A tool comprising a frame having substantially parallel arms spaced apart to form a slot between them adapted to receive a plurality of superimposed members to be riveted together, an anvil carried by one of the arms and facing the other arm, said other arm having an opening therethrough in line with the anvil, a barrel extending through said opening and adjustable axially therein, whereby said members can be clamped between the barrel and anvil, a cartridge block mounted in the outer end of the barrel for supporting an explosive cartridge, the barrel being adapted to slidably receive a stud, a breechblock mounted on the outer end of the barrel, and a firing pin carried by the breechblock to detonate the cartridge in order to drive the stud partially through said members, said anvil being provided with a socket shorter and wider than the portion of the stud partially driven through said members to receive and upset that portion to form a head engaging the superimposed members.

3. A tool comprising a frame having substantially parallel arms spaced apart to form a slot between them adapted to receive a plurality of superimposed members to be riveted together, an anvil carried by one of the arms and facing the other arm, said other arm having an opening therethrough in line with the anvil, a barrel extending through said opening and adjustable axially therein, whereby said members can be clamped between the barrel and anvil, means carried by the outer end of the barrel for supporting an explosive cartridge, the barrel being adapted to slidably receive a stud, and means carried by the outer end of the barrel to detonate the cartridge in order to drive the stud partially through said members, said anvil being provided with a recess having a tapered inner portion for receiving the point of the stud and an outer portion of greater diameter than the stud, and said recess being shorter than the portion of the stud partially driven through the members, whereby said portion of the stud will be upset in said outer portion of the recess to form a head engaging the adjoining superimposed members.

4. A tool comprising a frame having substantially parallel arms spaced apart to form a slot between them adapted to receive a plurality of superimposed members to be riveted together, an anvil carried by one of the arms and facing the other arm, said other arm having an opening therethrough in line with the anvil, a barrel extending through said opening and adjustable axially therein, whereby said members can be clamped between the barrel and anvil, a cartridge block removably mounted in the outer end of the barrel for supporting an explosive cartridge, the barrel being adapted to slidably receive a stud, a breechblock removably mounted on the outer end of the barrel and holding the cartridge block in place, and a firing pin carried by the breechblock to detonate the cartridge in order to drive the stud partially through said members, said anvil being provided with a socket shorter and wider than the portion of the stud partially driven through the members to receive and upset that portion in order to form a head engaging the adjoining superimposed members.

5. A tool comprising a frame having substantially parallel arms spaced apart to form a slot between them adapted to receive a plurality of superimposed members to be riveted together, an anvil carried by one of the arms and facing the other arm, said other arm having an opening therethrough in line with the anvil, a barrel extending through said opening and adjustable axially therein, whereby said members can be clamped between the barrel and anvil, a cartridge block removably mounted in the outer end of the barrel and provided with an axial passage of smaller diameter than the inside of the barrel, the front end portion of said passage having substantially the same diameter as the inside of the barrel and being adapted to frictionally receive one end of a stud, a breechblock removably mounted on the outer end of the barrel and holding the cartridge block in place, and a firing pin carried by the breechblock to detonate the cartridge in order to drive the stud partially through said members, said anvil being provided with a socket shorter and wider than the portion of the stud partially driven through the members to receive and upset that portion in order to form a head engaging the superimposed members.

6. A tool comprising a C-shape yoke having substantially parallel arms adapted to receive between them a plurality of superimposed members to be fastened together, an anvil carried by one of the arms and facing the other arm, said other arm having a threaded opening therethrough in line with the anvil, a barrel screwed in said opening and adjustable axially therein for clamping said members against the anvil, a cartridge block removably mounted in the outer end of the barrel and provided with an axial passage of smaller diameter than the inside of the barrel, the front end portion of said passage being enlarged to substantially the diameter of the inside of the barrel for frictionally engaging one end of the stud, a breechblock screwed onto the outer end of the barrel and holding the cartridge block in the barrel, and a firing pin carried by the breechblock to detonate the cartridge in order to drive the stud partially through said members, said anvil being provided with a recess having a tapered inner portion for receiving the point of the stud and an outer portion of greater diameter than the stud, and said recess being shorter than the portion of the stud partially driven through said members, whereby said portion of the stud will be upset in said outer portion of the recess to form a head engaging the superimposed members.

7. A tool comprising a barrel, means carried by the outer end of the barrel for supporting an explosive cartridge, the barrel being adapted to slidably receive a stud, means carried by the outer end of the barrel to detonate the cartridge in order to drive the stud partially through a work-piece, and an anvil on the side of the work-piece opposite to the barrel, said anvil being provided with a socket shorter and wider than the portion of the stud partially driven through the work-piece to receive and upset that portion in order to form a head engaging the work-piece.

ROBERT TEMPLE.

REFERENCES CITED

The following references are of record in the file of this patent:

UNITED STATES PATENTS

| Number | Name | Date |
|---|---|---|
| 1,277,370 | Bovard | Sept. 3, 1918 |